J. E. ENNIS.
SHELL MAKING MACHINE.
APPLICATION FILED DEC. 15, 1915.
1,272,784.
Patented July 16, 1918
11 SHEETS—SHEET 1.
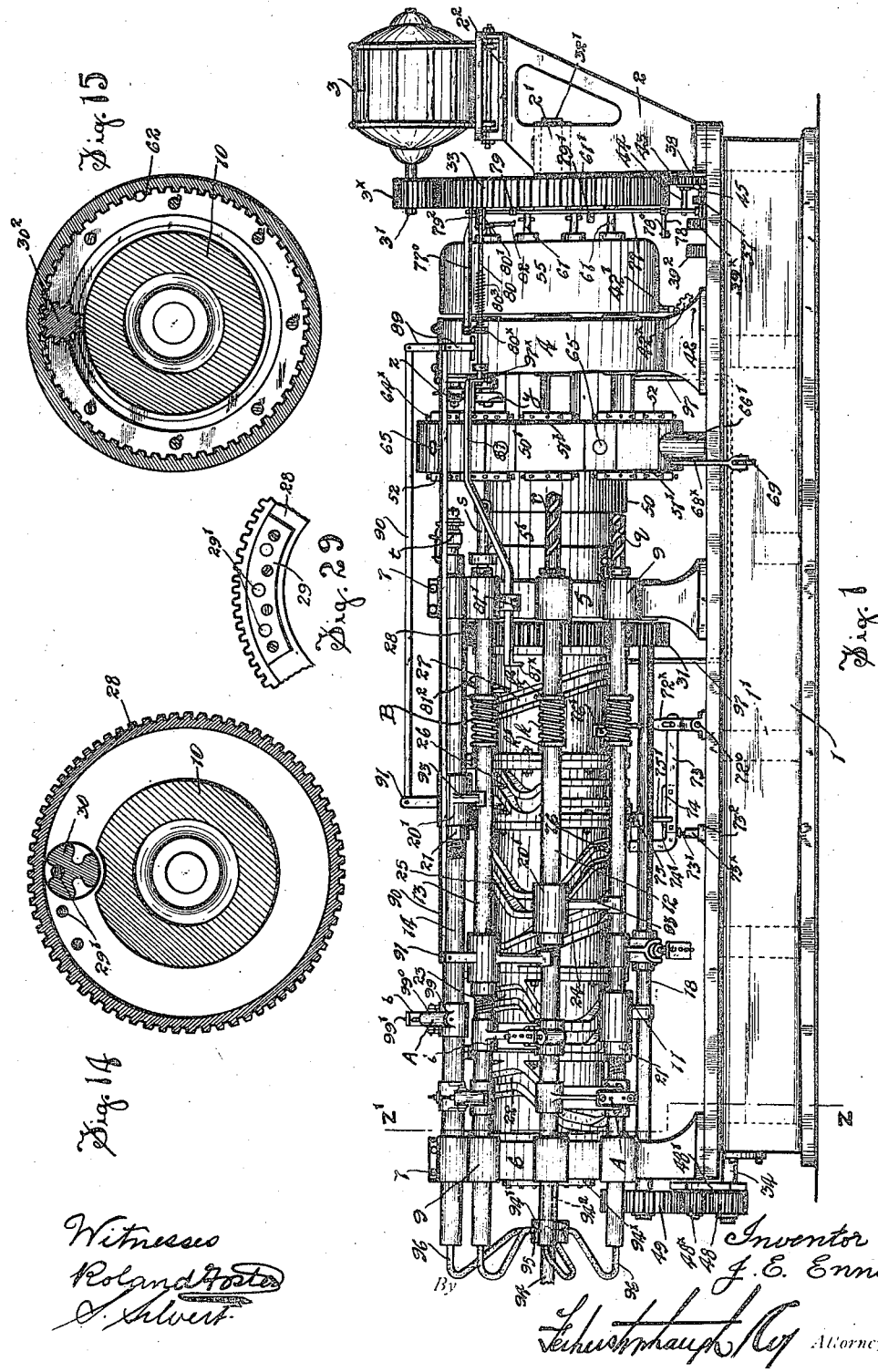

J. E. ENNIS.
SHELL MAKING MACHINE.
APPLICATION FILED DEC. 15, 1915.
1,272,784.
Patented July 16, 1918.
11 SHEETS—SHEET 2.
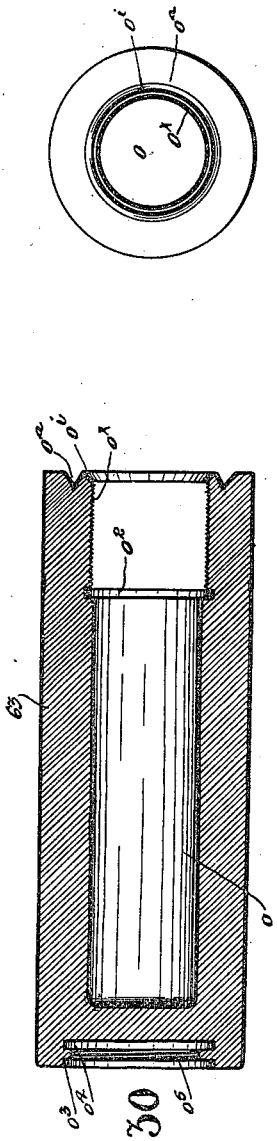
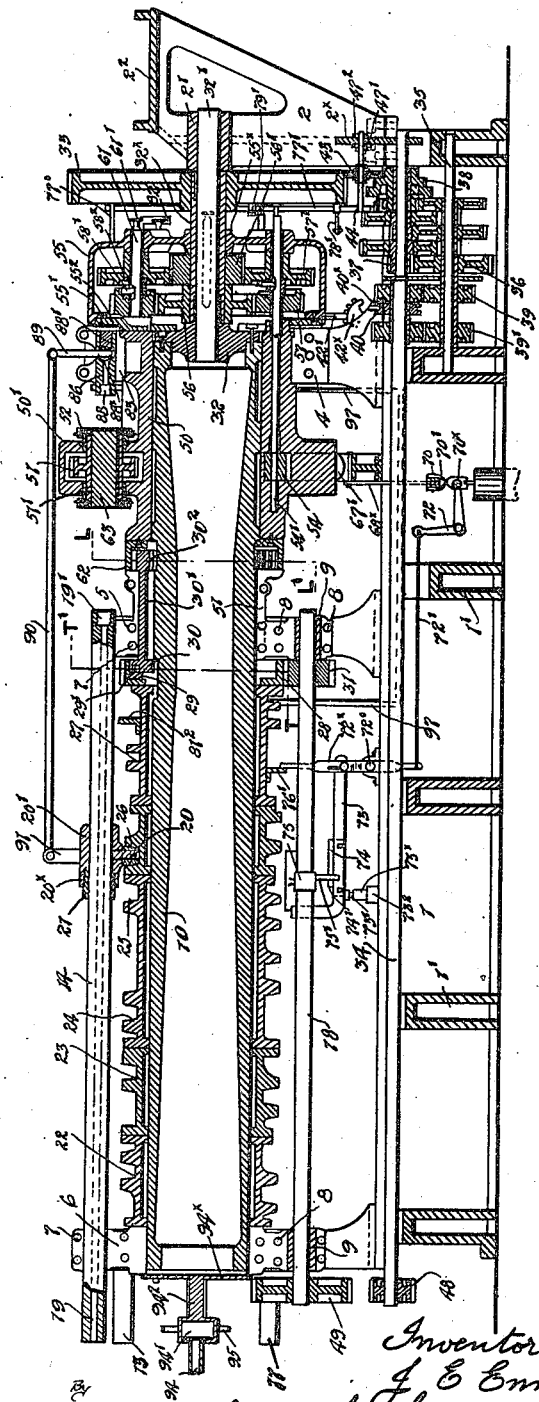
Witnesses
Roland Foster
A. Silvert
Inventor
J. E. Ennis

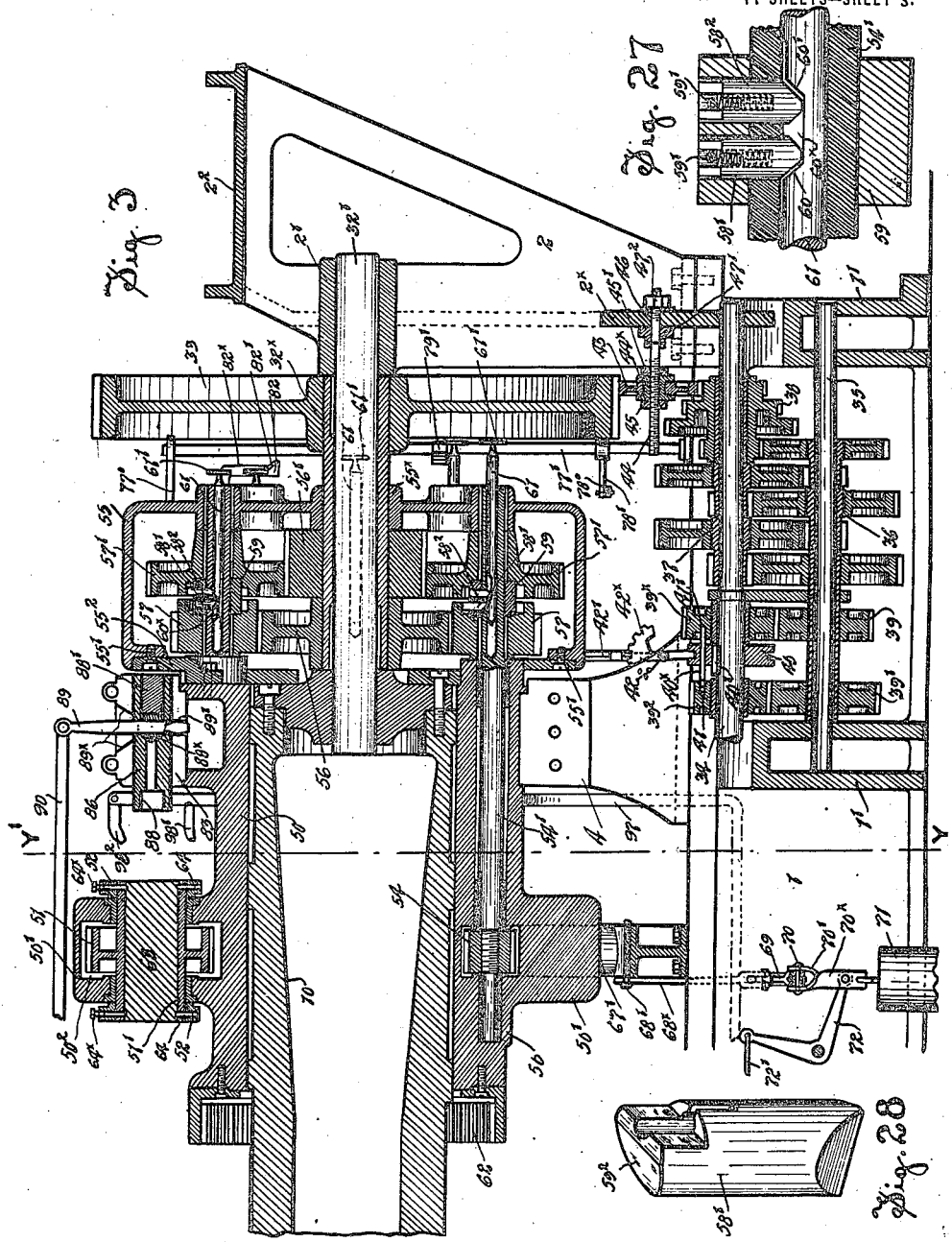

J. E. ENNIS.
SHELL MAKING MACHINE.
APPLICATION FILED DEC. 15, 1915.
1,272,784.
Patented July 16, 1918.
11 SHEETS—SHEET 4.
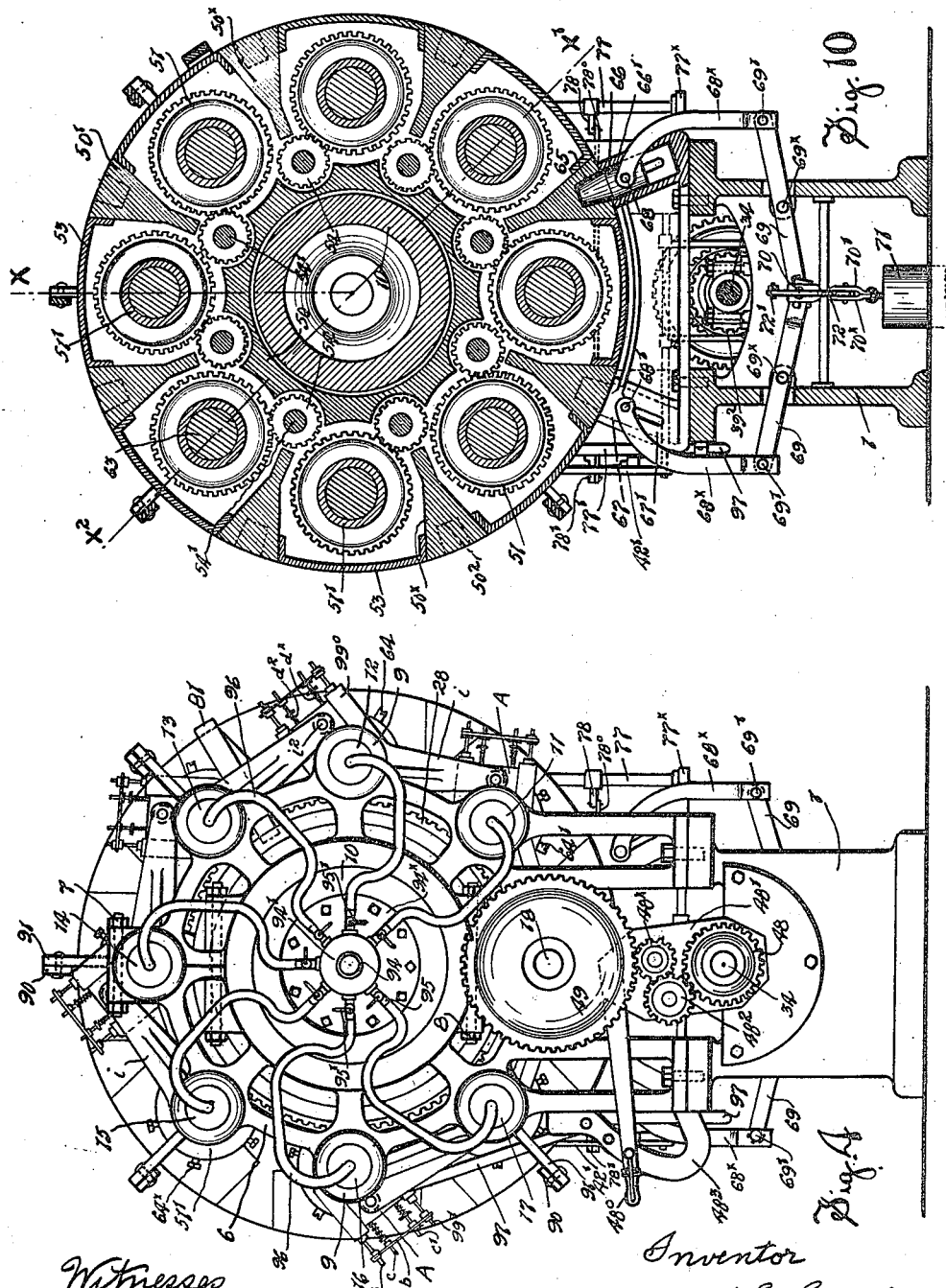

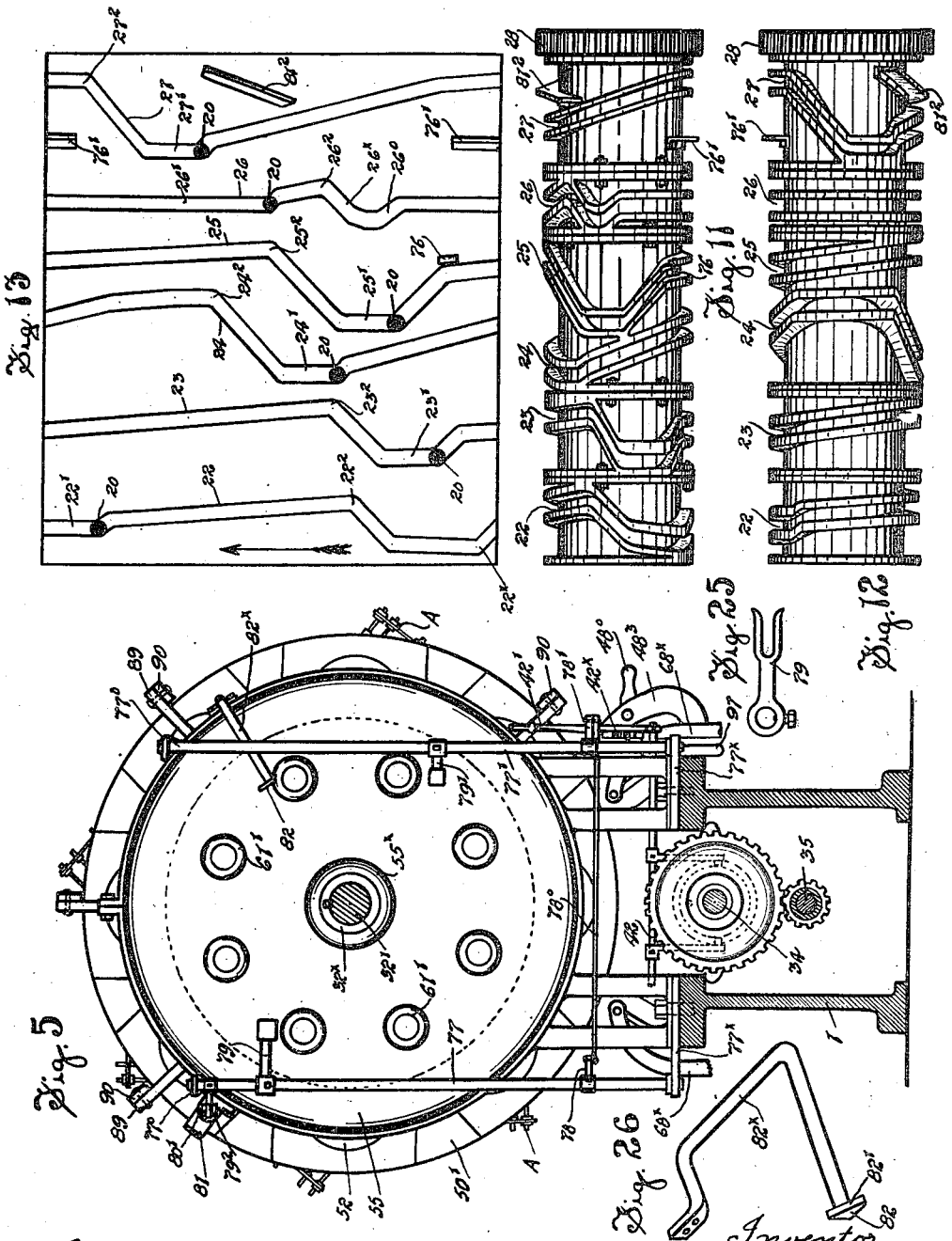

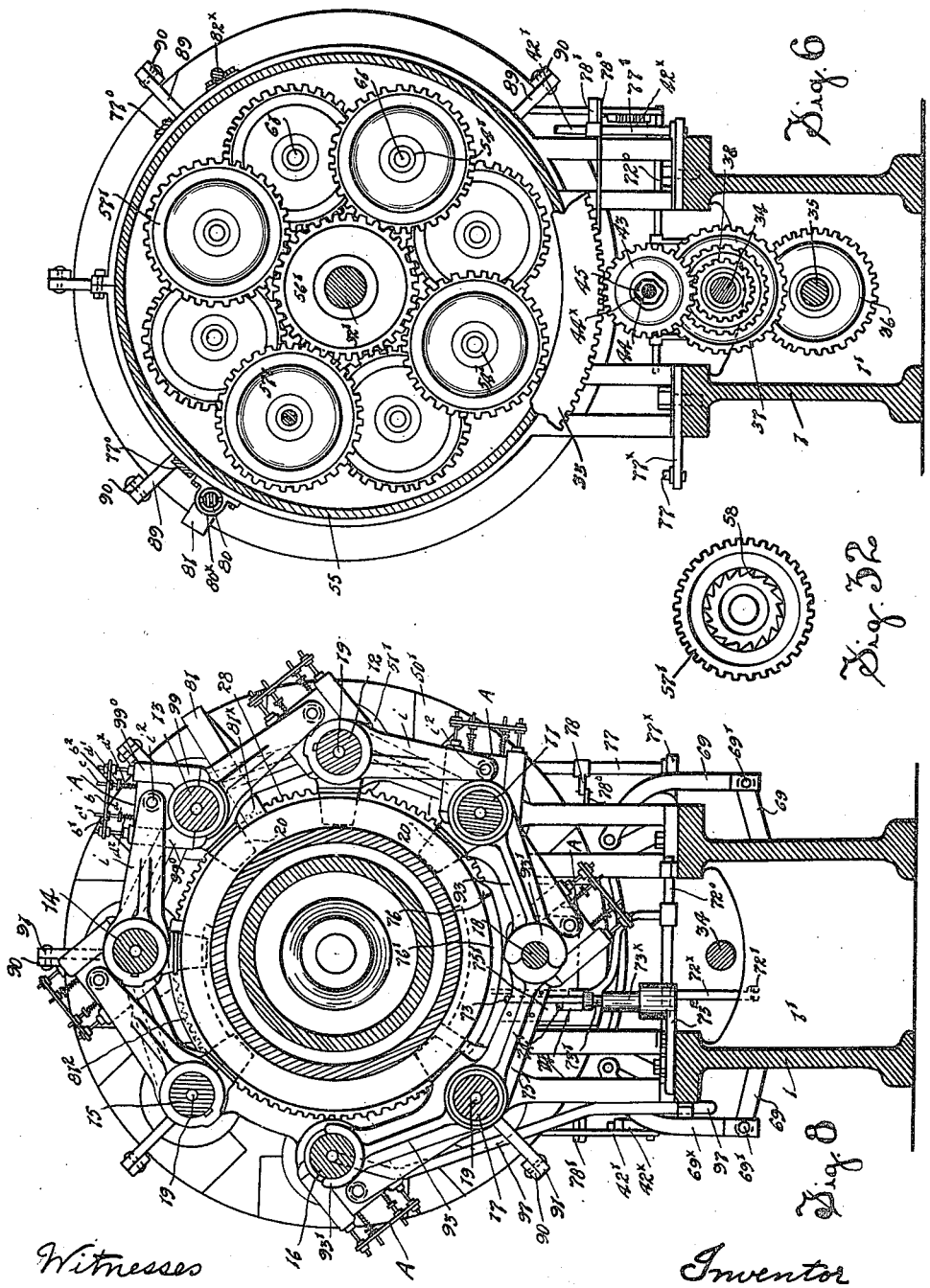

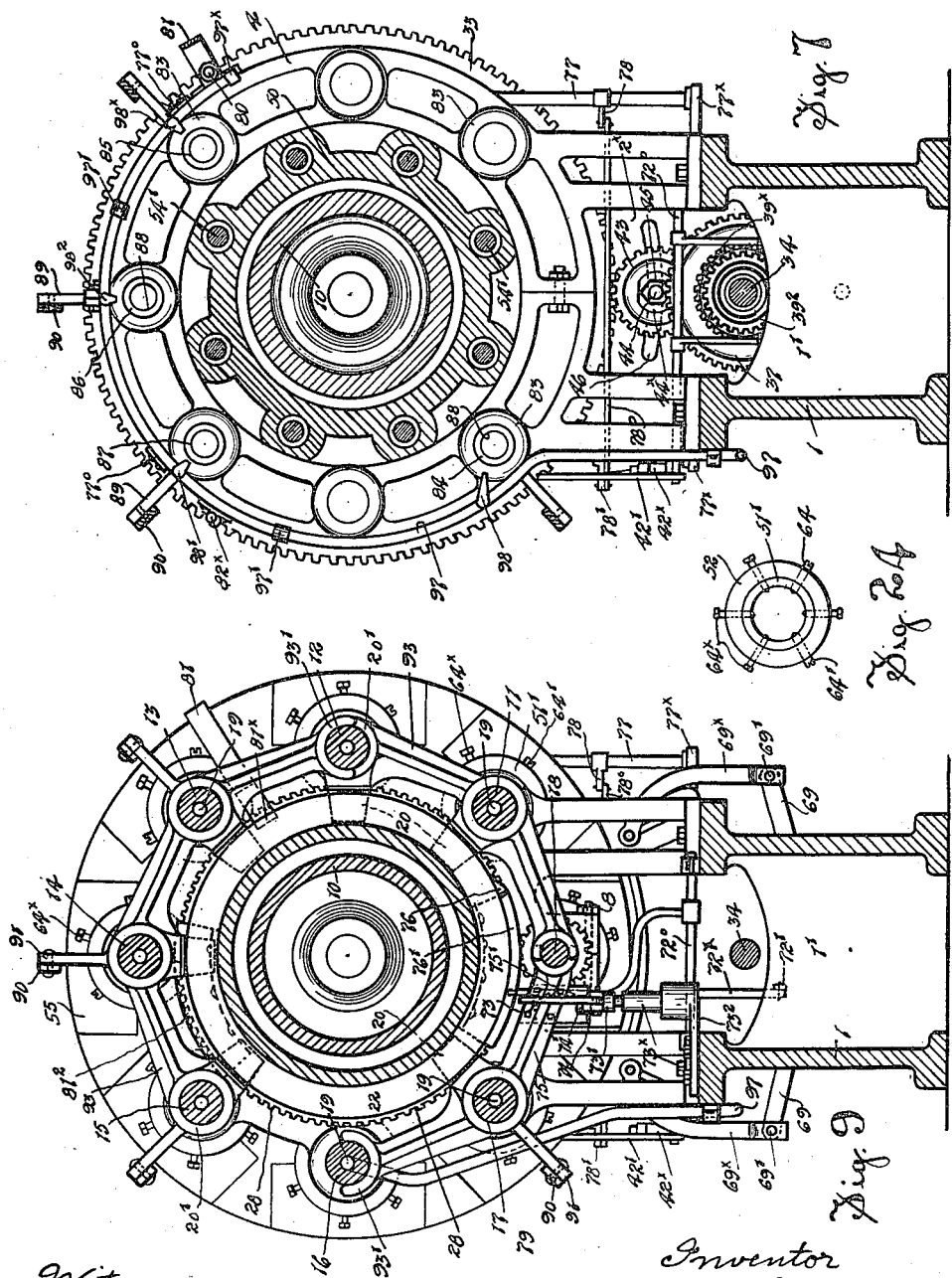

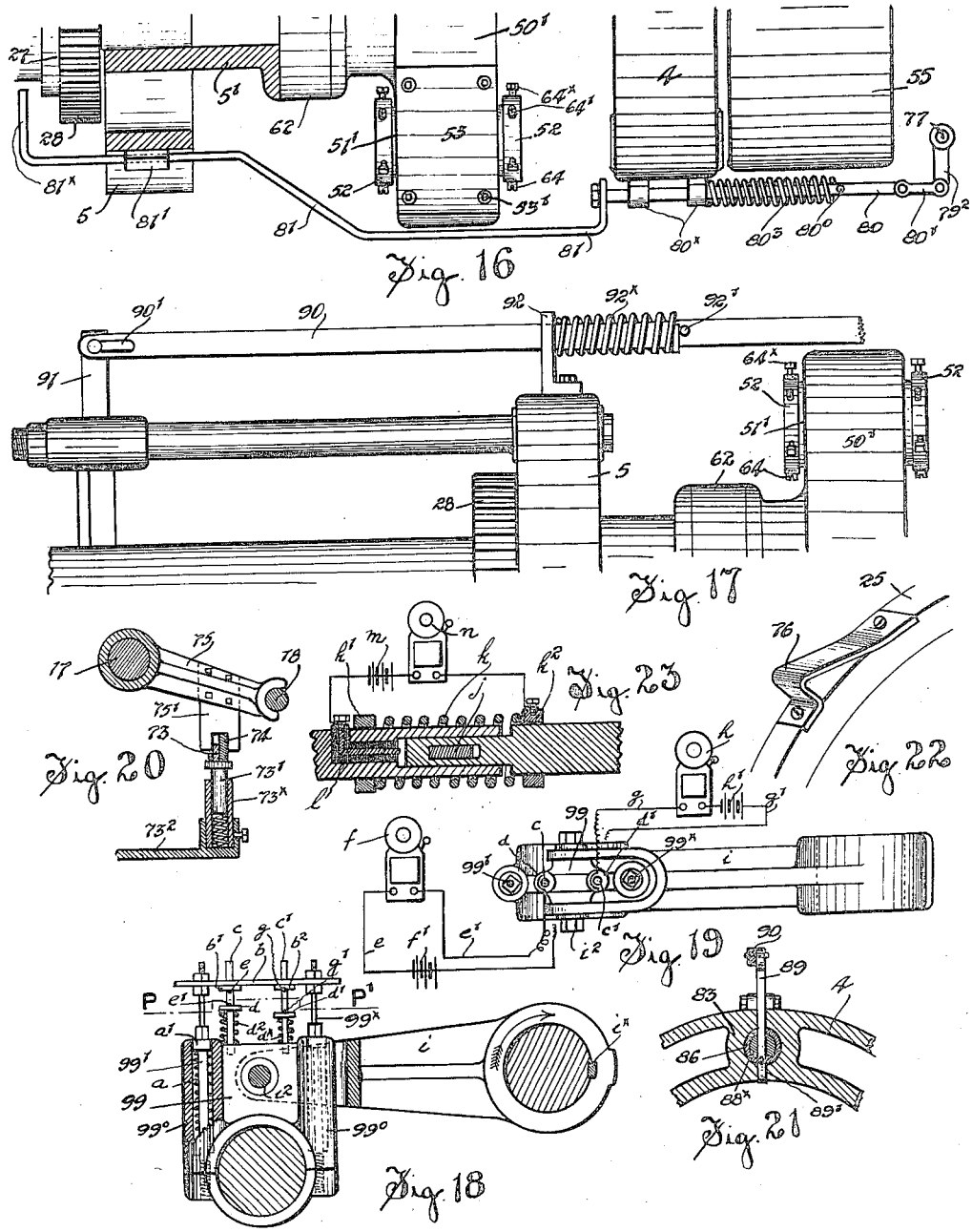

J. E. ENNIS.
SHELL MAKING MACHINE.
APPLICATION FILED DEC. 15, 1915.
1,272,784.
Patented July 16, 1918.
11 SHEETS—SHEET 9.
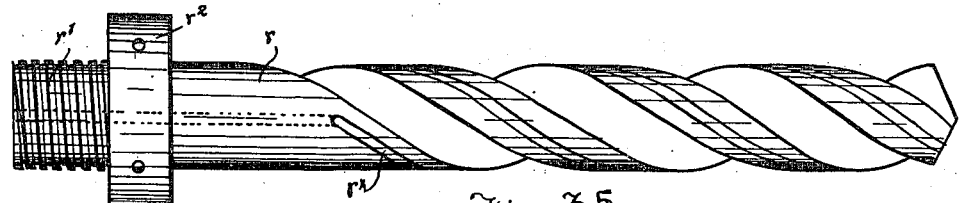
Fig. 35
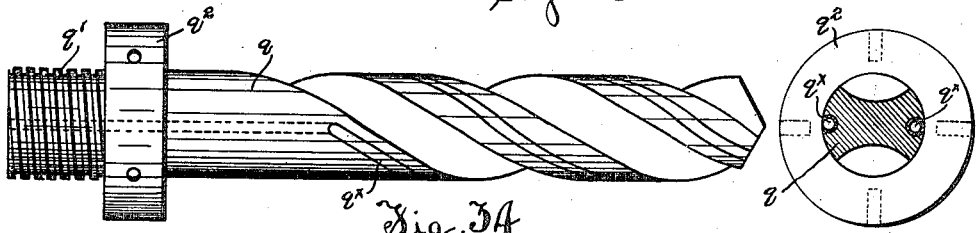
Fig. 34
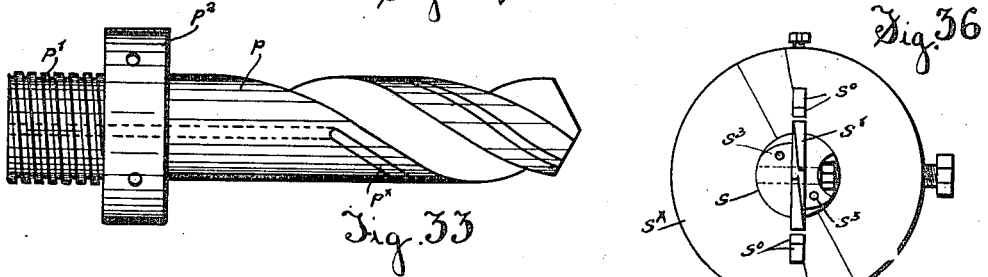
Fig. 33
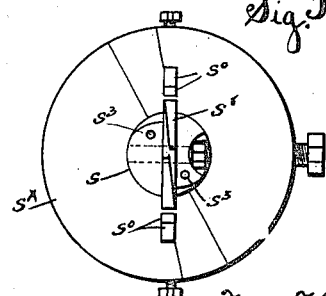
Fig. 36
Fig. 38
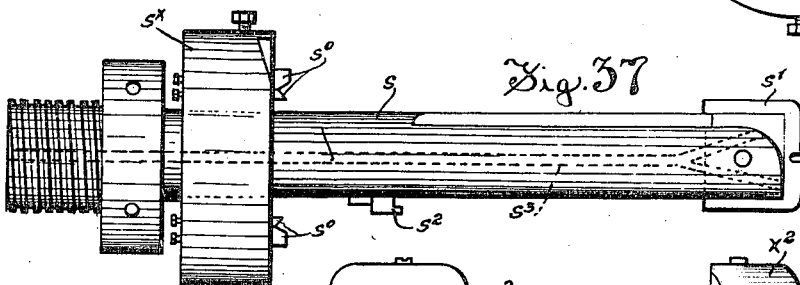
Fig. 37
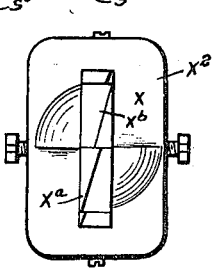
Fig. 46
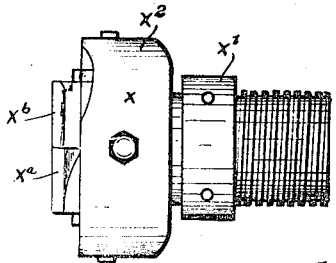
Fig. 45
Witnesses
Roland Foster
S. Silvert
Inventor
J. E. Ennis
By Fahnestaugh & Co.
Attorneys

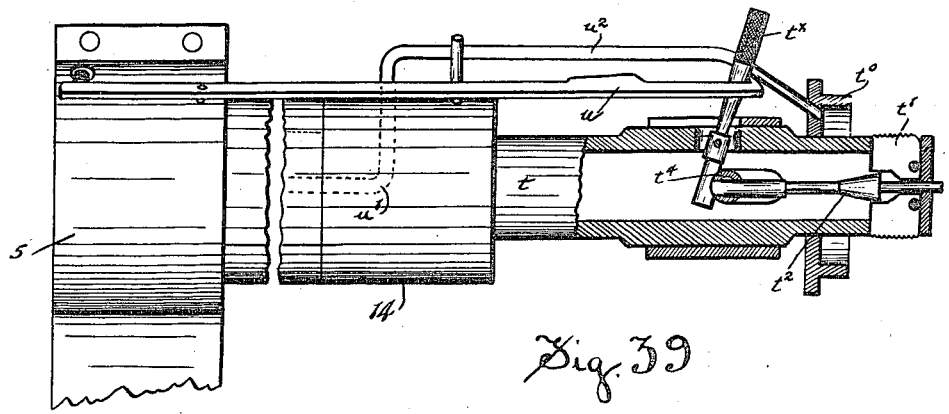
Fig. 39
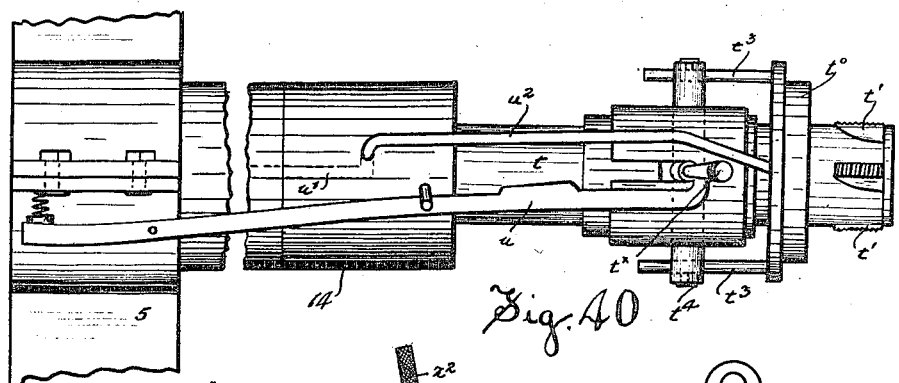
Fig. 40
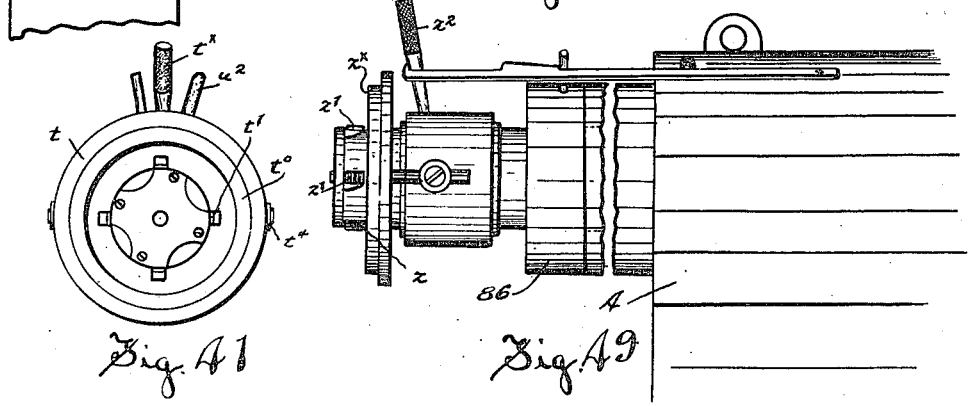
Fig. 41
Fig. 42

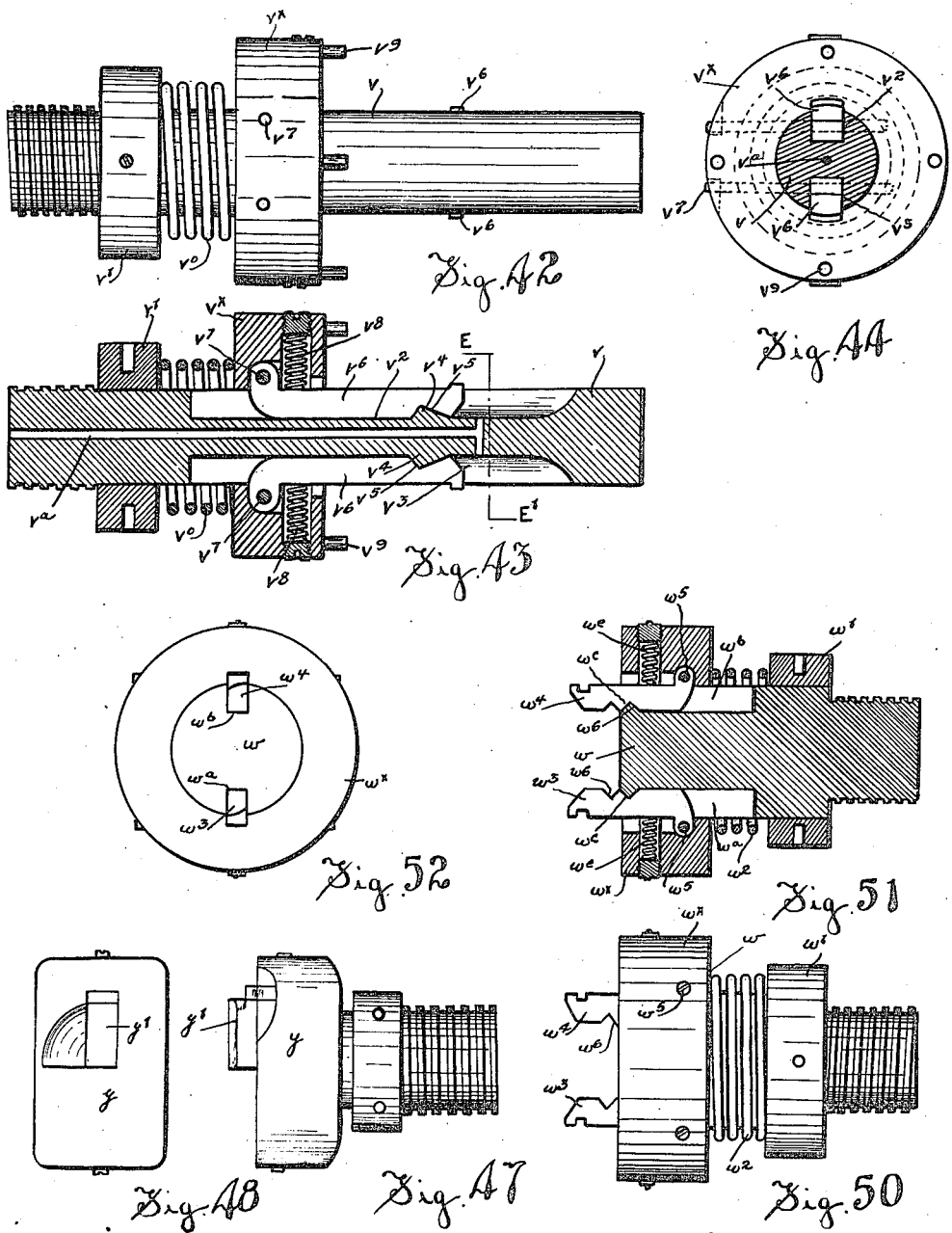

UNITED STATES PATENT OFFICE.

JOHN ELZEARD ENNIS, OF ST. BONIFACE, MANITOBA, CANADA.

SHELL-MAKING MACHINE.

1,272,784.   Specification of Letters Patent.   Patented July 16, 1918.

Application filed December 15, 1915. Serial No. 66,969.

*To all whom it may concern:*

Be it known that I, JOHN ELZEARD ENNIS, of the city of St. Boniface, in the Province of Manitoba, Canada, have invented certain new and useful Improvements in Shell-Making Machines, of which the following is the specification.

The invention relates to a machine for producing shells, and the principal object of the invention is to provide an automatic machine which will receive shell blanks or billets and will operate to do all the inside work on the shell billet prior to the same being removed from the machine. A further object of the invention is to provide a machine into which shell billets or blanks can be inserted or fed in succession and operated upon in a series of actions by the machine and delivered from the machine successively with the necessary interior work done in the shell. A further object of the invention is to provide a machine which will receive and complete the interior work on the shell blank without requiring resetting of the shell once it has been set in the machine. A still further object of the invention is to provide an efficient and effective water feed to the tools operating on the shell blanks. A still further object of the invention is to provide a variable speed machine the operation of which can be completely controlled by a single attendant. A still further object of the invention is to provide a machine which will indicate, by way of an alarm, any overload brought on the working tools, and while giving the alarm will also automatically prevent the overworked tool or associated parts from being damaged. A still further object of the invention is to provide a holder for the shell blank in which the blank can be quickly and accurately set.

With the above and other objects in view which will become more apparent as the description proceeds, the invention consists essentially in the arrangement and construction of parts hereinafter more particularly described and later pointed out in the appended claims, reference being had to the accompanying drawings in which:

Figure 1 represents a side view of the complete machine.

Fig. 2 represents a longitudinal sectional view through the machine.

Fig. 3 represents an enlarged detailed sectional view through the front end of the machine, the section through the rotatable head being taken in the plane denoted by the line X'—X' Fig. 10, while the section through the gear casing is taken in the plane denoted by the line X'—X² Fig. 10.

Fig. 4 is an enlarged end view of the tail end of the machine.

Fig. 5 is an enlarged end view of the head end of the machine with the driving gear removed and the shaft for the same shown in vertical section.

Fig. 6 represents an enlarged end view of the front end of the machine with the gear casing removed to expose the gears.

Fig. 7 is a vertical sectional view through the machine, the section being taken in the plane denoted by the line Y'—Y' Fig. 3, and looking forwardly.

Fig. 8 is an enlarged vertical sectional view through the machine, the section being taken in the plane denoted by the line Z'—Z' Fig. 1 and looking forwardly.

Fig. 9 is a vertical sectional view similar to that shown in Fig. 8, with the exception that the alarm appliances have been removed from the tool shafts.

Fig. 10 is a vertical sectional view through the machine, the section passing transversely through the shell holder or head.

Fig. 11 is a detailed side view of the cam drum looking at it from one side.

Fig. 12 is a detailed side view of the cam drum looking at it from the reverse side.

Fig. 13 is a diagrammatic view of the cams showing the drum as it would appear opened up or spread in the horizontal plane.

Fig. 14 represents an enlarged detailed vertical sectional view through the drum of the machine, the section being taken in the plane denoted by the line T'—T' Fig. 2, and looking forwardly.

Fig. 15 represents an enlarged detailed vertical sectional view through the drum of the machine, the section being taken in the plane denoted by the line L'—L' Fig. 2, and looking forwardly.

Fig. 16 is an enlarged detailed plan view of the automatic change gear controlling trip bar and adjacent parts.

Fig. 17 is an enlarged detailed face view of one of the tool controlling bars and adjacent parts.

Fig. 18 is an enlarged detailed side view of one of the automatic alarm appliances for the tool shafts, part being broken away to expose interior construction.

Fig. 19 is a horizontal sectional view through the alarm appliance, the section being taken in the plane denoted by the line P'—P' Fig. 18.

Fig. 20 is an enlarged detailed vertical sectional view through the socket carrying the pressure pin associated with the trip arm.

Fig. 21 is an enlarged detailed vertical sectional view through a portion of the front pedestal, the section passing through the top base tool shaft.

Fig. 22 is an enlarged detailed perspective view of the trip for the trip arm.

Fig. 23 is an enlarged detailed longitudinal sectional view through one of the tool shafts, showing a single alarm appliance applied on the shaft.

Fig. 24 is a detailed end view of one of the tool holders.

Fig. 25 is an enlarged detailed plan view of one of the forked arms.

Fig. 26 is an enlarged detailed perspective view of the trip rod controlling the change gear spindles.

Fig. 27 is an enlarged detailed vertical sectional view through the collar carrying the change gear dogs, said dogs, together with the spindles for actuating the same, being shown in side elevation.

Fig. 28 is an enlarged detailed perspective view of one of the dogs.

Fig. 29 is an enlarged detailed face view of the pin carrying plate attached to the cam driving gear.

Fig. 30 is an enlarged detailed longitudinal sectional view through one of the shell billets after it has been operated upon by my machine.

Fig. 31 represents an end view of the billet appearing in Fig. 30.

Fig. 32 is a side view of one of the driving gear wheels within the gear casing.

Fig. 33 represents an enlarged detailed side view of the first main working tool shaft drill.

Fig. 34 represents an enlarged detailed side view of the second main working tool shaft drill.

Fig. 35 represents an enlarged detailed side view of the third main working tool shaft drill.

Fig. 36 is a vertical cross sectional view through one of the drills.

Fig. 37 is an enlarged detailed side view of the reamer secured to the fourth main working tool shaft.

Fig. 38 is an end view of the reamer appearing in Fig. 37.

Fig. 39 is an enlarged detailed side view, part in section, of the tap secured to the fifth main working tool shaft.

Fig. 40 is a plan view of the tool appearing in the latter figure.

Fig. 41 is an end view of the latter tool.

Fig. 42 is an enlarged detailed side view of the grooving tool secured to the sixth main working tool shaft.

Fig. 43 is a longitudinal sectional view through the latter tool.

Fig. 44 is a vertical sectional view through the latter tool, the section being taken in the plane denoted by the line E'—E' Fig. 43.

Fig. 45 is an enlarged detailed side view of the reamer secured to the first working tool shaft.

Fig. 46 is an end view of the tool shown in the latter figure.

Fig. 47 is an enlarged detailed side view of the finishing reamer secured to the fourth working base tool shaft.

Fig. 48 is an end view of the latter tool.

Fig. 49 is an enlarged detailed side view of the tap secured to the fifth working base tool shaft.

Fig. 50 is an enlarged detailed side view of the grooving tool secured to the sixth working base tool shaft.

Fig. 51 is a longitudinal sectional view through the latter tool.

Fig. 52 is an end view of the latter tool.

In the drawings like characters of reference indicate corresponding parts in the various figures.

In connection with the inside machine work to be done on shell blanks or billets, it is here stated that these require to be bored out, internally grooved, internally threaded, nosed and flared at the one end, and reamed out, doubly grooved and screw threaded at the other end, in the manner as shown in Fig. 30 of the drawings, this being in accordance with specifications given the manufacturer. Up to the present the interior work done on the shell blanks has been carried out in several machines, and as the work done has to be exceptionally true considerable difficulty has been experienced and much time lost in setting up the shell for the various operations in the successive machines, and further, many shells have been spoilt owing to improper centering in the setting up of the billet when transferred from one machine to another. In my machine all the work done on the interior of the shell, and as hereinbefore intimated, is done during the time that the shell is in the machine and it is not necessary to reset the shell blank after it has been once placed in position. Further, under the ordinary method of manufacturing these shells, much handling was required. In my machine a plurality of shells are placed in the machine and are only taken out of the machine by the attendant after all the interior work has been done on them.

Referring now to the drawings;

1 represents the base of the machine which is mounted on any suitable permanent flooring and is more or less rectangular in form and is reinforced throughout its length and in suitable locations by cross webs 1'.

On the base I mount a front bracket 2 which presents an elevated central bearing 2', a table $2^2$ and a cross web $2^x$. On the table I mount permanently a motor 3, such as an electric motor.

3' represents the motor shaft, which shaft is supplied with a driving pinion $3^x$.

The base carries also three pedestals, a front pedestal 4, an intermediate pedestal 5 and a rear pedestal 6, which pedestals are permanently bolted to the base and are arranged and constructed in the manner shortly described.

The pedestals 5 and 6 are identical in construction with the exception that the pedestal 5 carries a forwardly projecting sleeve 5'. Each of these pedestals are two-part ones, being bolted together at the top and bottom as shown at 7 and 8 and they are provided each with eight bearing sleeves 9, these sleeves being arranged concentric to a common center point which is the center of the drum later described.

10 represents an open centered cylindrical drum carried by the rear, intermediate and front pedestals, the pedestals 5 and 6 being actually bolted around the drum while the pedestal 4 receives the drum, and having the body thereof varying in cross sectional area throughout its length so that it has the proper strength at required points.

In the bearing sleeves of the intermediate and rear pedestals I mount eight shafts 11, 12, 13, 14, 15, 16, 17 and 18 of which the shafts 11, 12, 13, 14, 15 and 17 are tool carrying sliding working shafts, shaft 16 is a fixed idle shaft and shaft 18 is a driving counter shaft. As will be noticed, all these shafts, with the exception of shaft 18, are bored centrally to provide a water duct 19 and have their forward ends terminating, normally, slightly in advance of the intermediate pedestal and cored out and internally screw threaded as shown at 19' and their rear ends projecting normally considerably beyond the rear pedestal. Each of these sliding working shafts is equipped with a cam roller indicated at 20, which is fastened to the shaft and extends inwardly in a direction radial from the shaft to the center of the drum. The cam rollers, in each instance, are carried by pins extending from sleeves 20' which are slidably mounted on the respective shafts and have their rear ends internally screw threaded as indicated at $20^x$ and receiving a short collar 21 exteriorly and interiorly screw threaded, the exterior thread screwing into the interior thread of the sleeve while the interior thread screw threads on the adjacent part of the shaft, which it will be observed is threaded.

According to the above arrangement it is obvious that an adjustment can be made in the position of the shaft in respect to the cam roller in each case.

The cam rollers are designed to operate in cams 22, 23, 24, 25, 26 and 27 rotatably mounted on the drum, there being a distinct cam to control the movement of each shaft through its cam roller.

The shaft 17 is controlled by the cam 22; the shaft 11 by the cam 23, the shaft 12 by the cam 24, the shaft 13 by the cam 25, the shaft 14 by the cam 26 and the shaft 15 by the cam 27. The cams when placed on the machine are slipped in proper order over the end of the drum and are all securely bolted together through flanges provided. The construction of these cams is as now described, reference being had particularly to Figs. 11, 12 and 13 of the drawings, and while considering these figures assuming that the direction of rotation of the cams is as indicated by the applied arrow in Fig. 13.

The first cam has a straight portion 22', which is actually the idle or non-operating period of the cam, after which it advances quickly and then more gradually until it reaches a point $22^2$ at which time it recedes abruptly and then gradually until it reaches a point $22^x$ where it again advances quickly to the straight or idle portion.

The second cam has a straight portion 23' after which it advances abruptly and then gradually until it reaches the point $23^2$ after which it recedes quickly to the straight portion of the cam.

The cam 24 has a straight portion 24' after which it advances quickly and then gradually until it reaches the point $24^2$ where it again recedes quickly to the straight portion of said cam.

The cam 25 has a straight portion 25' after which it advances quickly and then gradually until it reaches the point $25^2$ after which it recedes quickly back to the straight portion thereof.

The cam 26 has a straight portion 26' after which it advances quickly and then gradually to a point as shown at $26^2$ and then recedes abruptly backwardly as shown at $26^x$ and then gradually backwardly and finally forward again as shown at $26^o$ to the straight portion of the cam.

The cam 27 has a straight portion 27' after which it advances quickly and then gradually until it reaches a point 27² after which time it recedes abruptly back to the original straight portion thereof.

The above cams directly control the action of the tools, as later described by moving the tool shafts, and for this reason their special construction has been outlined as the tools controlled thereby have to be advanced during a definite interval to the work, then do their work and be afterward withdrawn from the work.

I wish here to mention that in so far as the first three cams are concerned the second cam advances approximately twice the distance of the first cam while the third cam advances approximately three times the distance of the first cam.

To the front end of the last cam I secure permanantly a driving gear wheel 28 which has the rim thereof of an angle iron section, and to the inner side of the wheel I fasten permanently a flat segment 29 which is fitted with three forwardly projecting and horizontally disposed pins 29'. These pins are designed, in the rotation of the cams, to engage with a specially constructed driving gear 30 housed within the wheel and located at the rear end of a forwardly directed spindle 30' rotatably mounted in the top part of the intermediate pedestal, the spindle being provided at the forward end, and in advance of the sleeve 5', with a driving pinion 30².

The gear wheel 28 is driven by a pinion 31 fixed on the forward end of the counter shaft 18.

32 is a head plate permanently secured by fastening screws to the front end of the drum and carrying a forwardly directed, stationary shaft 32', the front end of which is mounted in the bearing 2' hereinbefore referred to. On this shaft I place a sleeve 32ˣ to which I fasten the main driving gear wheel 33 of the machine, this gear wheel being positioned to mesh with the pinion 3ˣ of the motor.

34 is a driving shaft suitably mounted in the base of the machine and passing centrally lengthwise thereof, and 35 is an auxiliary shaft located at the base of the machine directly beneath the forward end of the shaft 34.

On the forward ends of these shafts I mount trains of intermeshing gears and pinions indicated at 36 and 37, which gears and pinions are designed and arranged such that the speed of rotation is reduced considerably between the initial three-speed driving gear indicated at 38 and the finally driven pinions, of which there are two, indicated at 39 and 39', it being noticed that the pinion 39 is somewhat smaller than the pinion 39'.

The pinions 39 and 39' are continuously in mesh with gears 39² and 39ˣ rotatably mounted on the shaft 34 and between these two gear wheels I locate a grooved wheel 40 which is feathered on the shaft as indicated at 40' and carries a pin 40ˣ having the ends thereof projecting and designed to engage with suitable pockets 41 and 41' located in the opposing faces of the gears 39² and 39ˣ.

The sliding wheel is under the control of arms carried by a pivotally mounted cross rod 42 which has the end thereof terminating in an upright lever 42' which is provided with a detent operating over a quadrant 42ˣ.

From the above arrangement it will be seen that one, by manipulating the lever and setting the detent in respect to the quadrant, can hold the pin 40ˣ such that it engages with one or other of the gear wheels 39² and 39ˣ and accordingly causes the engaged gear wheel to drive the shaft 34. As the gear wheels are of different size, a variation in speed is provided by this adjustment.

Between the main gear wheel 33 and the three-speed drive gear 38 I locate a pinion 43 which is carried by an adjustable stub axle 44 carried by the web 2ˣ. The latter pinion, in the present instance, is shown as rotatably mounted on a sleeve 44ˣ which is held in position on the stub shaft by a pair of lock nuts 45 and 45' screw threaded onto the stub shaft.

The front end of the stub shaft is received within an arcuate slot 46 formed in the web 2ˣ and it is held to the web by a collar 47' at the one side and a jam nut 47² at the other side.

According to this arrangement I can, by adjusting the axle in the slot and by applying different sized pinions on the axle, obtain a variation in the speed at which the main gear wheel rotates the initial gear wheel 38 of the train of gears. This, together with the reduction in speed obtainable through the use of the gears 39² and 39ˣ, gives me a wide range of speed, as will be readily understood.

The rear end of the shaft 34 is fitted with a driving gear 48 and adjacent this gear and on the shaft I have mounted a plate 48' which carries a pair of pivotally mounted intermeshed pinions 48² and 48ˣ which are designed to form a drive connection between the gear 48 and a gear wheel 49 secured to the rear end of the counter shaft 8 and driving the same. This plate is controlled by a hand lever 48° which is arranged so that it can be fastened in various positions to a fastening bar 48³ secured to the rear pedestal.

If reference be made to Fig. 4 of the drawings, it will be seen that in the position shown the gear wheel 49 will be driven in the opposite direction to the gear wheel 48 by the intervening intermeshing pinions. If, however, the lever be thrown up, it will be apparent that the pinion 48$^x$ will pass out of mesh with the gear wheel 49 and the pinion 48$^2$ will become intermeshed with the gear wheel 48 and the gear wheel 49. Consequently, in this position the gear wheel 49 will be driven in the same direction as the gear wheel 48. The pinions are arranged also such that there is an intermediate position with both of them out of mesh with the pinion 49. In such latter case the gear wheel 49 will not be driven by the gear wheel 48.

The above construction gives me a forward or reverse drive for the counter shaft and a neutral position in which the counter shaft is not driven, and consequently, I can, through the pinion 31 and gear wheel 28, effect a forward or reverse rotation of the cams.

50 represents a sleeve rotatably mounted on the forward end of the drum immediately in advance of the sleeve 5', and having the forward end thereof received rotatably within the front pedestal and within the inner wall of the front pedestal and the outer wall of the drum. The sleeve carries a head 50' formed as an outstanding integral part thereof, which head is provided with radially disposed webs 50$^x$ between which I reserve pockets 50$^2$ for the driving gear wheels 51 of the cylindrical shell holders 51', the shell holders being rotatably mounted in the sides of the head (see Fig. 3) and having their ends projecting beyond the opposite faces of the head and fitted with out-turned flanges 52 which prevent end movement of the shell holders in the heads. In actual practice there are eight equally spaced shell holders disposed in the head around the drum and their centers are arranged equal distances from the center of the drum and alined horizontally, in the normal position of the head, with the respective shafts 11, 12, 13, 14, 15, 16, 17 and 18.

The pockets or cavities containing the gear wheels 51 are housed in by applied plates 53 suitably fastened to the head by removable bolts 53' (see Fig. 16).

The various gear wheels 51 are arranged to be driven each by a pinion 54 suitably housed within the head and located, in each instance, on the rear end of a forwardly directed driving shaft 54' which passes, in each instance, through a suitable opening provided in an enlargement of the sleeve and projects considerably beyond the forward end of the sleeve, that is, beyond the front pedestal.

For convenience in mounting the pinions on the shafts 54', it will be noticed (see Fig. 3) that the tail or rear ends of the said shafts are reduced in cross sectional area and then threaded to receive the pinions. In this way, once the pinions have been inserted in their places, the shafts can be put in place from the front end of the machine and screw threaded into and through the pinions.

From the above it is obvious that each shell holder has an independent drive shaft by which it can be rotated in its bearings in the head.

The forward or projecting ends of the shafts 54' are carried in suitable bushings provided in a gear casing 55 which is permanently secured such as by screws 55' to an attaching plate 55$^2$ connected to the front end of the sleeve 50.

The gear casing is fitted with a central bearing 55$^x$ which is mounted on the sleeve 32$^x$.

Within the gear casing and on the sleeve 32$^x$ I locate a large driving pinion 56 and a small driving pinion 56', these rotating with the sleeve when driven by the main gear wheel 33.

On each of the shafts 54' and within the gear casing I mount rotatably a large driving gear wheel 57' and a small driving gear wheel 57, these latter gear wheels meshing respectively with the pinions 56' and 56.

The adjacent faces of the pairs of gear wheels 57 and 57' are provided with projecting flanges, the inner sides of which are fitted with ratchet teeth 58, which teeth are designed to be engaged by sliding dogs 58' and 58$^2$ carried by a collar 59 secured to each of the shafts 54' in a location between the gear wheels.

The dogs, in each instance, are held normally in by spiral springs socketed in the body of the dogs and engaged by cross pins 59$^x$ extending from the collar.

The outer ends of the dogs are tapered off as indicated at 59$^2$ (see Fig. 28) so that they will readily engage with the ratchet teeth hereinbefore mentioned, upon the dogs being outwardly pressed, and the inner ends of the dogs are more or less of a wedge shape so that they can be readily manipulated by the tapering end walls 60 and 60' of cross slots 60$^x$ located in controlling spindles 61 slidably mounted in the forward ends of each of the shafts 54' which are bored out to receive them.

The forward ends of the spindles terminate in flat knobs 61' which appear at the front side of the casing concentrically arranged around the shaft 32' (see Fig. 5.).

From the above arrangement it will be obvious that one, by manipulating the knobs in or out, can cause one or other of the dogs to engage with the ratchet teeth of one or other of the gears 57 or 57' as the case may be, or he can place the spindles in a central position, so to speak, in which position neither one of the dogs is projecting against the ratchet teeth. This latter position is shown in Fig. 27 of the drawings, while in Fig. 3 the top spindle is shown in a position such that the right hand dog is extended and the left hand dog withdrawn and the bottom spindle is shown such that the left hand dog is extended and the right hand dog is withdrawn. In the last two positions in the first instance the projecting dog will operate to effect the driving of its shaft 54 through the gear wheel 57' and the pinion 56, (this being a slow drive), while in the second instance the projecting dog will operate to effect the driving of its shaft 54 through the gear wheel 56 and pinion 57, (this being a fast drive). The precise manner in which the knobs are controlled will be described hereinafter.

The sleeve 50 carrying the head 50' is arranged so that it can be rotated by means of an internal gear wheel 62 permanently fastened to the rear end of the sleeve and engaging with the pinion $30^2$ hereinbefore mentioned.

The shell blanks or billets 63 put in this machine are inserted in the shell holders and are held in position within the shell holders by a pair of adjusting screws 64 and 64' and a plurality of fastening screws $64^x$, (see Fig. 24), these screws being passed through the flanges 52 and jamming in against the face of the shell billet. It is here to be noticed that the adjusting screws 64 and 64' are fitted with slotted heads while the other screws have square heads.

In actual practice, the screws 64 and 64' would be accurately set to properly center the inserted shell blank in the holder and then would not be tampered with, the actual holding and releasing of the billet being effected through the tightening up or loosening of the screws $64^x$.

Each of the main sliding tool shafts, in this machine, is designed, under the action of its cam, to bring the tool carried thereby to a position such that it will operate on each one of the billets carried by the holders, and in order that this can be accomplished it is obvious that the head carrying the billets will have to be rotated to present the shells carried by the holders to the successive tools. As there are eight shell holders disclosed in the drawings, it is necessary to rotate the head an eighth of a revolution intermittently, the rotation occurring during the period that the tools are free from the shells. Further, it is obvious that during the working period of the tools the head will have to be locked against rotation.

I will now describe the parts controlling the release and locking of the head. In this connection I might mention that the parts which control the rotation of the head have already been disclosed, these being the pinion 30 and the pins 29'.

The webs $50^x$ of the head are each provided with a locking pocket 65, these pockets being equally spaced apart around the periphery of the head.

66 and 67 represent a pair of locking pins slidably carried in short cylinders 66' and 67' suitably reinforced and permanently mounted on the base of the machine, which locking pins are designed, when extended from the cylinders, to enter the pockets of the head when such pockets are presented.

The locking pins are controlled by short studs 68 and 68' which project outwardly through suitable slots provided in the sides of the cylinders and are connected to the upper ends of links $68^x$ which have their lower ends forked and connected by means of pivot pins 69' to the outer ends of rocking levers 69 which pass through the sides of the base and are pivotally connected thereto as shown at $69^x$. The inner ends of these levers are slotted and receive a pin 70, which pin supports a pair of hangers $70^x$ and 70' which carry a weight 71.

According to the above arrangement it is obvious that the weight will have a constant tendency to hold the inner ends of the lever 69 down, with the result that the locking pins are normally held locked within the pockets and the head is accordingly held against rotation. The raising of the weight and consequently the release of the locking pins is accomplished and controlled in the following manner.

72 is a pivotally mounted bell crank having the rear arm thereof inserted between the hangers $70^x$ and 70' and pivotally secured thereto, and the upper arm thereof connected by means of a rod 72' to the lower end of a pivotally mounted trip lever $72^x$ carried by a suitably located cross rod $72^\circ$ mounted on the base of the machine.

To the upper portion of the lever $72^x$ I connect pivotally the front end of a more or less L-shaped trip arm 73 having the upturned rear end thereof extending toward the cam 25, such rear end being supported by a spring pressed pin 73' mounted in a socket $73^x$ carried by a suitably located arm $73^2$ fastened to the base. The body portion of the trip arm is fitted with a stop plate 74 which has the upper edge thereof projecting above the upper edge of the trip arm and thereby presenting a shoulder as indicated at 74'. The stop plate is arranged, in the operation of the machine, to be engaged and caught by a slotted catch plate 75' which spans both the stop plate and the trip arm and is permanently secured to an overhanging arm 75 having one end secured to the shaft 17 and the other end bearing slidably on the shaft 18.

The cam 25 carries a trip 76 which is located such that in the turning of the cam it will engage with and depress the upturned rear end of the trip arm at a proper instant.

The cam 27 carries an applied combination catch and release outstanding flange 76' which is designed to catch and hold the upper end of the lever 72$^x$.

In order to better understand the operation of the parts just disclosed, it is explained that in the backward movement of the shaft 17, under the action of its controlling cam, the catch plate 75' is brought to the rear of the shoulder 74' (the trip bar being continuously held up by the pressure pin 73'), with the result that in the initial forward movement of the said shaft the shoulder causes the catch plate to carry the trip bar bodily ahead with it, the distance which it carries the head being entirely controlled by the position of the trip 76, which, in the rotation of the cams, hits the trip arm and releases the catch plate from the shoulder. The sliding or forward movement so effected in the trip arm rocks the lever in a direction such that the weight is raised and the locking pins are released from the pockets thereby releasing the head. Once the locking pins have been withdrawn they are held out for a set period of the rotation of the cams, by the upper end of the lever 72$^x$ which, after the trip arm has been carried forward, passes behind the combination catch and release flange 76' which holds the upper end of the lever ahead even after the catch plate has been released from the shoulder. Further, the instant the upper end of the lever escapes over the passing end of the flange 76', in the rotation of the cams, the weight is instantly released to drop with the result that the locking pins are instantly projected into the locking pockets of the head.

In connection with the rotating movement of the head 50', it is pointed out that as the pins 29' will only engage the pinion 30 once during each complete rotation of the cams, then the head will remain stationary during the interval that the pins are away from the pinion and will rotate during the interval that the pins are engaged with the pinion. The pinion 30$^2$ and the internal gear 62 are designed such that each time the spindle 30' is actuated by the pinion 30, the head will be rotated an eighth of a revolution, which is the distance required to bring the shells successively to the tools.

In order to automatically control the speed of the shafts 54', I provide an attachment located at the front end of the machine which push in and pull out the knobs 61' at a proper time and by so doing effect the movement of the dogs 58' and 58$^2$.

For reasons later apparent, it is desirable to have the shell holders located opposite the tool shafts 17, 11 and 12 rotated at a higher rate of speed than those shell holders which are directly opposite the forward ends of the shafts 13, 14 and 15, and have the tool holder which is brought opposite the forward end of the shaft 16 thrown out of commission in so far as the drive is concerned. To accomplish this, parts now disclosed are used.

77 and 77' are a pair of forward upright shafts located in advance of the gear casing and having their lower ends rotatably mounted in suitable outstanding carrying plates 77$^x$ secured to the base and their upper ends rotatably mounted in stationary carrying bars 77° which are permanently fastened to the front pedestal 4. These shafts are provided with cranks 78 and 78' connected by a connecting rod 78° so that they are compelled to operate together. They carry also each a forked arm shown at 79 and 79', the forked arm 79 being considerably longer than that 79' so its throw is twice as great as the throw of the arm 79'.

79$^2$ is an outstanding crank permanently secured to the upper end of the shaft 77 and connected by means of links 80' with a trip rod 80 slidably mounted in suitable bearings 80$^x$ secured to the pedestal 4, which rod is also supplied with a cross pin 80° and a spring 80$^3$ which engages with one of the bearings and with the pin.

To the end of the rod I attach a trip bar 81 which spans over the rotating head, is slidably secured to the pedestal 5 by a strap 81' and has the rearmost end thereof inturned as shown at 81$^x$ and designed to be engaged by an angularly disposed trip flange 81$^2$ permanently secured to the front cam of the machine. This trip flange is arranged, in the rotation of the cams, to engage with, press forward and release the trip bar at a proper interval, and by so doing swing the crank 79$^2$ ahead and effect the inward swinging of the arm 79 and the outward swinging of the arm 79'. The spring returns the forked arms to the original position once the inturned end of the trip bar escapes past the rearmost end of the trip flange.

The arms 79 and 79' are designed to span the knobs and are positioned such that the knobs, in the rotation of the gear casing, pass through the forks. During the interval that the knobs are entered between the forks, the arms are designed to be swung due to the escape of the end 81$^x$ of the trip bar from the flange 81$^2$. The result is the knob caught by the long arm 79 is thrown in the full distance which effects the engagement of the dog 58² with the gear wheel 57', while the knob caught by the arm 79' is thrown out from what might be termed its central position to its full out position, the result being that the dog 58' is engaged with the gear 57.

In order to bring the passing knobs from their full in position, as operated by the arm 79, to their intermediate position, I supply a catch plate 82 having an inclined face 82' and permanently secured by means of a bracket 82˟ to the front pedestal 4. The catch plate is designed such that the inclined face thereof will pass into the path of travel of the knobs and will catch the oncoming in-knob and cause it to be forced out as it passes to an intermediate position, which intermediate position is that in which the spindles 61 are positioned in respect to the dogs as shown in Fig. 27.

By arranging the above parts in the manner shown best in Fig. 5 of the drawings, it will be seen that the shell holder which is passed, in the rotation of the head, directly in front of the shaft 16, will be thrown out of commission and will become idle through the action of the plate 82 which will throw the knob controlling that particular spindle to the idle position of the dogs. Further, it will be seen that a short time after the said shell holder has passed the latter position it will again be thrown into commission, that is, it will be driven owing to the fact that the knob in passing down will be caught by the forked arm 79' and carried out. This action will cause that shell holder to be rotated at its highest speed. It will remain rotating at its highest speed until the knob controlling it has passed to the arm 79 at which time it will be caught and thrown full in and will afterward rotate at its lowest speed until it is thrown out by the catch plate 82. In this connection I might explain that the shells are put into and taken out of the shell holders when they are brought to the position directly opposite the forward end of the shaft 16, so that it is necessary, and as above explained, to have the driving of the shell holder stopped at this location for a short interval to allow this work to be done.

The pedestal 4 is provided with seven bearings 83 in the nature of sleeves, which bearings are alined longitudinally with the central axes of the shafts 11, 12, 13, 14, 15, 16 and 17. Four of these bearings receive slidably short base tool shafts 84, 85, 86 and 87 which shafts are alined respectively with the main tool shafts 17, 13, 14 and 15. Each base tool shaft has its forward end bored out and screw threaded as shown at 88 to receive base tools (hereinafter described) and its rear end fitted with a screw plug 88' which holds a pivot ball 88˟ within the shaft.

The balls as well as the shafts and bearings are all slotted radially in respect to the pedestal to receive outstanding operating levers 89 which have their inner ends slidably mounted as shown at 89' in the inner slots in the bearings and their outer ends freely operative in the outer slots in the bearings, which it will be noticed are formed with tapering end walls 89˟ to permit of the forward and back movement of the levers.

The levers 89 are connected by means of connecting bars 90 with outstanding operating arms 91 secured one to each of the shafts 17, 13, 14 and 15, so that the movement of the shafts control, through the shifting of the connecting bars, the operation of the levers and the consequent forward and backward travel of the base tool shafts.

The connecting rod for the base tool shaft 84 is slotted as shown at 90' (see Fig. 17) at its point of connection with the arm 91, and is slidably carried by a bracket 92 secured to the pedestal 5. It is fitted also with a cross pin 92' and a spiral spring 92˟ is located between the pin and the bracket, the spring being arranged to hold the connecting bar ahead. This particular connecting bar is slotted for the reason that the travel of the shaft 17, due to its cam, is greater than the travel required in the base tool controlled by that cam. Consequently, the slot allows the shaft to travel part of its distance without operating the connecting bar. In the drawings no slots have been shown in the other connecting bars for the reason that the travel of the main tool shafts which control them is properly proportioned to give the required movement to the respective connecting bars to operate the base tools actuated thereby. It will, however, be understood that if necessary these bars could be slotted to take up extra movement if desired, in the same manner as the bar for the base tool 84 has been slotted.

In the operation of the machine it is necessary to positively prevent the main tool shafts from rotating, and with this in view I have formed holding arms 93 which are cast preferably, integral with the sleeves 20', the projecting ends of such arms being cast more or less semi-circular in cross section as indicated at 93' so that they will receive and ride on the adjacent main shafts. The arms 91 hereinbefore described project also from the sleeves 20'.

In order to supply water to the working tools, I provide the following parts.

94 is a main water feed pipe which communicates directly with a water distributer 94' located at the rear end of a short bracket 94² carried by a supporting plate 94˟ permanently secured by bolts to the rear end of the drum 10. To this distributer I connect seven similar short nipples 95 fitted with valves 95' and between the nipples and the ends of the respective shafts 11, 12, 13, 14, 15, 16 and 17 I introduce lengths of flexible water tubes 96, the outer ends of the tubes communicating directly with the water ducts 19 of the shafts. This supplies water to the front ends of the main tool shafts.

To the front end of the fixed idle shaft 16 I connect a feed pipe 97 which passes forwardly to the rear of the pedestal 4 to which it is attached by means of hangers 97' (see Fig. 7). The end of the pipe is closed by a plug $97^x$ and it is fitted at intervals throughout its length with short nozzles 98, 98', $98^2$ and $98^x$ which are designed to direct a stream of water on the base tools carried by the base tool shafts.

Certain of the main tool carrying working shafts, that is, those which carry the greatest load when working, are fitted with alarm appliances A and B which are designed to operate and when operated to intimate by an alarm that the shaft is overloaded. One of these appliances that A is to intimate an overload torsionally and the other B is to intimate when the end thrust on the shaft becomes excessive. The device for indicating the overload torsionally is first described.

It comprises (see Figs. 18 and 19) a two-piece boxing 99 which receives one of the tool working shafts, the lower part of the boxing being provided with two upstanding spindles 99' and $99^x$ which passes through tubular enlargements $99^0$ formed as part of the other half of the boxing. Spiral springs "$a$" are located within the tubular enlargements, which springs bear against the closed ends of said tubular enlargements and against plungers "$a'$" secured to the spindles and operating slidably within the enlargements.

The projecting ends of the spindles are suspended by an adjustable cross plate "$b$" to the under side of which I have secured a pair of insulating plates "$b'$" and "$b^2$".

"$c$" and "$c'$" are a pair of short rods having their lower ends permanently secured to the upper half of the boxing and their upper ends projecting slidably through the plate "$b$."

"$d$" and "$d'$" are insulating plates mounted on the rods and held normally up by inserted springs "$d^2$" and "$d^x$" so that the plate "$d$" is elevated higher than the plate "$d'$".

Positive and negative electrical feed wires "$e$" and "$e'$" lead from the plates "$b'$" and "$d$" to an electric alarm bell "$f$," there being a suitable source of electromotive force such as a battery "$f'$" embodied in the circuit.

Positive and negative electrical feed wires "$g$" and "$g'$" lead also from the plates "$d'$" and "$b^2$" to a second electric alarm bell "$h$", there being a suitable source of electromotive force such as a battery "$h'$", also inserted in this circuit.

"$i$" is an operating arm permanently secured such as by a key "$i^x$" to the working shaft immediately adjoining the one carrying the boxing, which arm has the outer end thereof bifurcated and connected pivotally by a pin "$i^2$" to the upper part of the boxing.

According to this arrangement it will be obvious that if the shaft carrying the arm "$i$" be subjected to too great a torsional strain in a direction as indicated by the applied arrow, Fig. 18, the arm "$i$" will rise and in rising will carry with it the upper half of the boxing with the result that the ends of the wires "$e$" and "$e'$", which are carried by the plates "$d$" and "$b'$", will be first brought together to effect the closing of the circuit and the ringing of the bell "$f$". This is an initial alarm. Upon a greater strain being brought on the shaft the ends of the wires "$g$" and "$g'$", carried by the plates "$b^2$" and "$d'$", will be brought together to effect a second alarm by means of the bell "$h$". The arms "$i$" reset themselves under the action of the springs "$a$".

The second alarm appliance for indicating when the end thrust in the shaft becomes excessive is constructed as best shown in Fig. 23 of the drawings. The working shafts are split at a suitable location to form front and rear sections and have the meeting ends of the sections telescoped one within the other and connected by a flat cross pin "$j$". In this arrangement it is to be noted that there is a clearance allowed to permit of the front section of the shaft sliding back.

The front section of the shaft is held normally ahead, and for normally working conditions, by the action of a heavy spiral spring "$k$" which operates between a pair of collars "$k'$" and "$k^2$" permanently secured to the adjacent telescoped ends of the shaft.

"$l$" is a suitably insulated contact wire embedded in the rear section of the shaft, which wire has the forward end thereof designed to engage with the rear end of the front section of the shaft when the said front section is pushed back. The opposite end of this wire is connected in a suitable electric circuit which contains a battery "$m$" and a bell "$n$" and is completed through the collar "$k^2$".

In considering the above connections it is obvious that upon the right hand section of the shaft, as shown in Fig. 3, being forced back, the rear end of it will engage with the forward end of the wire "$l$" and will cause the circuit to effect the ringing of the bell. Such backward movement of the front section of the shaft will only be occasioned when the tool carried by that shaft is subjected to an excessive end thrust greater than that as allowed for by the spring "$k$" and which would injure the cam rollers.

As hereinbefore intimated, this machine has been specially constructed to do all the interior work required on a shell blank or billet, the completed shell having a sectional appearance as shown in Fig. 30 of the drawings, where it will be seen that it is internally bored at "$o$", has the front end thereof flared and nosed as at "$o^1$" and "$o^a$", is internally screw threaded for a short distance as shown at "$o^x$", is provided with an inset channel or groove as at "$o^2$", has the rear or base end formed with a pair of spaced grooves "$o^3$" and "$o^4$" and the grooves separated by a screw threaded shoulder "$o^5$".

The tools utilized are herein described and comprise three drills, a reamer, a tap and an expansion reamer for the shafts 11, 12, 13, 14, 15, 16 and 17, and a reamer, a tap, an expansion reamer and a finishing reamer for the shafts 84, 85, 86 and 87.

The drills for the shafts 17, 11 and 12 are shown best in Figs. 33, 34 and 35 respectively, and are indicated by the reference numerals "$p$", "$q$" and "$r$". It is to be noticed that these three drills are of varying length, the arrangement being such that it requires three of them to make the complete bore "$o$" in the shell.

Each of the drills have their ends screw threaded at "$p'$," "$q'$" and "$r'$" to screw thread into the forward ends of the shafts and they are fitted with stop shoulders "$p^2$," "$q^2$" and "$r^2$" having suitably located sockets therein to admit of a tool for screwing them in.

Water tubes "$r^x$," "$q^x$" and "$p^x$" are counter sunk in the faces of the drills, these terminating at the cutting and screw threaded ends so that when the said drills are attached to their working shafts the water passed through the ducts 19 will feed through the tubes directly to the work.

The reaming tool "$s$," connected to the shaft 13, is best shown in Figs. 36 and 37. This reaming tool is supplied with a shoulder and a screw threaded end whereby it can be attached to the shaft and has the forward end of the shank fitted with a reamer "$s'$" and at some distance back from the forward end it is supplied with a second reamer "$s^2$." Between this second reamer and the shoulder the tool carries a collar "$s^x$" in which I have adjustably mounted a pair of diametrically opposing reamers "$s^0$." This reaming tool is designed such that the reamer "$s'$" will ream out and round the inner end of the bore "$o$" so that the reamer "$s^2$" will enlarge slightly the front end of the bore, (that is, where it is afterward screw threaded) such that the reamers "$s^0$" will flare and nose the front end of the shell as indicated at "$o^a$" and "$o^1$."

The reaming tool is bored longitudinally as indicated at "$s^3$" to provide a water duct which will be continuous with the water duct 19 of its shaft.

The tapping tool "$t$" secured to the shaft 14 is of well known construction, being, what is commercially called, an automatic collapsing tap. It presents a set of chasers "$t'$" which are directly under the control of an expanding stem "$t^2$" the stem being advanced by movement of a striking lever "$t^x$" and withdrawn by the action of a striking plate "$t^0$." The particular way in which the chasers are expanded is indicated in Figs. 39 and 40, where it will be noticed that there is a pivotally mounted spring pressed catch bar "$u$" connected to the pedestal 5, which bar is arranged to catch the lever at a proper instant as the tool is advanced to its work, and throw it back to expand the chasers before the tool reaches its work. After the work has been done the chasers are withdrawn by the action of the striking plate "$t^0$" which engages with the face of the work and is shoved back sufficiently to withdraw the stem "$t^2$" by way of its connection with the stem through the rods "$t^3$" and cross pin "$t^4$." The chasers are forced out by the enlarged end of the tapering part of the stem engaging the opposing inclined shoulders provided on the chasers, and then returned to their initial position under the action of the spring as soon as the stem is forced back to normal position.

It has not been considered necessary to enter into a more detailed explanation of this tool as its construction and operation is well known. It operates, in this particular machine, to internally thread the shell as shown at "$o^x$." The tool "$t$" threads into the forward end of its carrying shaft in the same manner as the other tools and is partially bored as indicated at "$u'$" and is then supplied with a tube "$u^2$" which communicates with the bore and with the striking plate "$t^0$." The arrangement is such that the water coming through the duct 19 of that shaft will be fed directly through the tube and onto the work.

The expansion reamer "$v$" attached to the shaft 15 is screw threaded to the shaft in the same manner as the foregoing tools and is fitted with a shoulder "$v'$" and a sleeve "$v^x$," the sleeve being slidably mounted on the shank of the tool and being spaced from the shoulder by means of an interposed spring "$v^0$." The shank is longitudinally slotted as indicated at "$v^2$" and "$v^3$" with the base of the slot presenting a pair of controlling humps "$v^4$" which are designed to enter into the notches "$v^5$" located in the undersides of expanding reamers "$v^6$" pivotally secured at "$v^7$" witin the sleeve and held in their normal position by the action of inserted springs "$v^8$." The face of the sleeve carries striking pins "$v^9$" which are designed, in the advancement of the tool, to strike against the face of the work and by so doing effect the withdrawal of the reamers and the consequent expansion of the front or cutting ends, owing to the humps. After the cutting ends have been expanded and have done their work, and upon the withdrawal of the tool, the spring "$v^o$" resets the sleeve in the initial position. The cutting ends of the reamers are designed to form the groove "$o^2$" at the front end of the shell. This tool is also longitudinally bored as shown at "$v^a$" so that water can be supplied to the work from the duct 19 of that particular tool shaft.

The above completes the description of the tools carried by the main working shafts of the machine. I will now describe the tools carried by the base tool shafts.

The base tool shaft 84 carries a reaming tool "$x$" which is screw threaded for attachment to the shaft and is supplied with a shoulder "$x'$" and a head "$x^2$", the head carrying adjustable reamers "$x^a$" and "$x^b$" which are designed, in the operation of the tool, to effect the necessary cutting of the groove "$o^3$" in the base of the shell and to counter-bore the base of the shell at the point where the thread and second groove afterward appear. This tool is supplied with water by the nozzle 98.

The base tool shaft 85 carries a finishing reaming tool "$y$" (see Fig. 47) which is identical in construction to the reaming tool "$x$" with the exception that it is fitted only with one reamer "$y'$". This tool is supplied with water through the nozzle $98^x$.

The base tool shaft 86 carries an expanding tapping tool "$z$" (see Fig. 49), which is constructed in the same manner as the tapping tool "$t$". The chasers "$z'$" of the tool "$z$" are arranged to cut a thread indicated at "$o^4$" in the base of the tool and it is operated in expanding and contracting through the manipulation of the lever "$z^2$" and the striking plate "$z^x$". This tapping tool is supplied with water through the nozzle $98^z$.

The base tool shaft 87 carries an expanding reaming tool "$w$" (see Figs. 50 and 51) which has the end thereof screw threaded to connect with the shaft and is supplied with a collar "$w'$" and a sleeve "$w^x$", the sleeve and collar being separated by an inserted spiral spring "$w^2$". The shank of the tool is longitudinally grooved as shown at "$w^a$" and "$w^b$" and the faces of the grooves are supplied at the forward ends with humps "$w^c$".

"$w^3$" and "$w^4$" are expanding reamers operating within the grooves, pivotally secured at "$w^5$" to the sleeves and having their under sides supplied with notches "$w^6$" which are arranged to operate on the humps. Spiral springs "$w^e$" are located in the head, these springs holding the reamers normally in. As this tool advances to the work, the reamers are expanded gradually by the front face of the sleeve striking the work and causing the hump to travel from the first notch into the second. During the travel of the hump the tool is expanded and collapsed. The spring resets the tool after it has been withdrawn by the carrying shaft. This reaming tool is designed to clean out the groove "$o^3$" and cut the groove "$o^4$" in the face of the shell and it is supplied with water through the nozzle 98'.

I wish here to state that although I have described all the various tools, still I do not wish to be restricted to having to use these precise tools for the work to be done on the shell. Any other tools which would accomplish this work would serve my purpose as effectively. For this reason the tools herein disclosed are only to be considered in this specification as a means for accomplishing the required cuts necessary in the shell.

The above completes the description of all the parts of the machine, but in order that it may be better understood I will now describe its operation.

A shell blank or billet is inserted in the shell holder, that is, the one initially opposite the shaft 16, and after being properly centered by means of adjusting the screws 64 and 64' is fastened tightly in the shell holder by manipulating the screws $64^x$. The feed water is then turned on, the motor is started and the levers 42' and 48° are set to drive at a predetermined speed. At this point it is assumed that the tool carrying shafts are all back. The throwing in of the levers effects, through the pinions 31 and the drive gear 28, the simultaneous driving of the cams and through the gears and pinions in the gear casing the simultaneous rotation of the driving shafts 54' and through them the rotation of the pinions 54, the gear wheels 51 and the consequent rotation of the shell holders.

The first rotation of the cams is an idle one in so far as the working tools are concerned, as no work is done on the first admitted shell blank until it reaches, due to the rotation of the head 50', a position opposite the second tool shaft 17. Of course, in the initial rotation of the cams the head is released, turned an eighth of a revolution and locked by the action of the trip 76 and combined catch and release flange 76' to bring and lock the first inserted shell blank in a position directly alined with the second shaft 17. A second shell blank is then placed in the shell holder which has been brought by the initial partial rotation of the head opposite the shaft 16. This action of filling in a shell blank into each of the holders is continued each time the head is rotated an eighth of a revolution, and it is here explained that after the head has been turned one complete revolution the first inserted shell is ready to be taken out, all the work having been done on it by the successive tools. The action is, accordingly, a continuous one once the machine has been working a short time, as it only requires a new shell blank to be inserted in the tool holder after the completed shell has been removed from that tool holder.

Reverting back to the operation of the machine, after the tool holders have been filled, it will be seen that as the cams rotate they continuously advance and recede the tools to do the required work on the shell, the movement of the tools being entirely accommodated by the precise construction of the respective cams which are arranged to advance and withdraw the individual tools the proper distance to accommodate the work for which they are designed. As the tools carried by the shafts 17, 11, 12, 13, 14 and 15 advance to the work in a direction toward the front end of the machine the tool shafts 84, 85, 86 and 87 are advanced to the work in a direction toward the back end of the machine.

The trip 76 and the combined catch and release flange 76' have to be located on the cams in such a manner that the locking pins 66 and 67 will be released from the head to allow it to rotate immediately after the tools have completed their work on the shell blank and will be held positively out, during the rotation of the head, and will be released instantaneously to lock before the tools are ready to start forward.

The object of supplying the change speed appliance at the front end of the machine for controlling the speed of rotation of the shafts 54' can now be better understood, as it is well known that tools such as drills can be speeded up much higher than tools such as reamers and taps. In my case, however, it is to be understood in this connection, that instead of the tool rotating the shell holder is rotated while the tool is advanced. The forked arms 79 and 79' are arranged to catch the knobs, as hereinbefore explained, and move them in proper order so that the shafts 54', which are actually driving the holders being drilled, are driven at a high speed, while those shafts 54' which drive the other tools are operated at a lower speed and that shaft which is controlling the tool holder being brought in front of the shaft 16 is thrown out of commission.

Reverting to the operation of the head it is explained that it is moved to turn an eighth of a revolution for each complete revolution of the cams, and this one-eighth revolution is obtained through the action of the pins 29' engaging with the specially constructed driving gear 30, the driving gear being rotated by the action of the pins sufficiently far to effect, through the pinions 30² and the internal gear wheel 62, one-eighth of a revolution of the head.

The tool shafts carrying the tools for operating on the base of the shell are advanced and receded by the action of the levers 89, the upper ends of which are moved backwardly and forwardly by the connecting bars 90 in turn advanced and receded by the arms 91 secured to the tool shafts 17, 13, 14 and 15.

I wish here to particularly emphasize the feature that once the machine is started it is not stopped, but is continuously operating to produce the shells. During the interval that a completed shell is being taken out of the shell holder and a new blank is being inserted the tools are working on all the other shells in the machine, so that no time is lost, and actually, a shell is being completed during the interval that a shell blank is being inserted and a finished shell is being taken out.

I may state also, that a machine has been constructed as above disclosed, which machine operates successfully to do the work for which it has been designed.

What I claim as my invention is:—

1. A multiple station machine of the character specified including in combination, a rotatable carrier having a plurality of rotatable chucks, each of which is provided with means for clamping a work piece, and means concentric with the axis of the rotatable carrier for simultaneously rotating said chucks, operating tools disposed relative to certain of said chucks for operating simultaneously upon the work pieces carried thereby, and means whereby any one of said chucks may be thrown out of gear while the work pieces held by the other chucks are rotated and operated upon.

2. A multiple station machine of the character specified including in combination, a rotatable carrier having a plurality of rotatable chucks each of which is provided with means for clamping a work piece so that it may be operated upon simultaneously at each end of the chuck, operating tools located upon opposite sides of the carrier and disposed relative to certain of said chucks for operating respectively upon the opposite ends of the work piece simultaneously, and means whereby one of said chucks may be thrown out of gear while the work piece held by the other chucks are being operated upon.

3. In a shell making machine in combination, a rotatably mounted head, concentrically arranged shell billet receiving and containing holders mounted in the head, means for rotating the head, releasable means for intermittently locking the head against rotation, driving means for continuously rotating the shell billet holders in both the locked and unlocked positions of the head and means operating during the interval that the head is turning to vary the speed of rotation of selected holders.

4. In a shell making machine in combination, a rotatably mounted sleeve, a head carried by the sleeve, concentrically arranged driving shafts rotatably mounted in the sleeve and having their forward ends projecting beyond the sleeve, pinions secured to the rear ends of the shafts and in mesh with the gear wheels, gear wheels mounted on the projecting forward ends of the shafts, a stationary shaft located concentric to the shafts, a sleeve rotatably mounted on the stationary shaft, means for driving the sleeve and a pinion secured to the sleeve and meshing with all the gear wheels at the forward ends of the shafts.

5. In a shell making machine in combination, a suitably supported stationary drum, a sleeve rotatably mounted on the drum, an outstanding head formed integral with the sleeve, concentrically arranged shell billet receiving and containing holders rotatably mounted in the head, means for intermittently rotating the head on the drum, gear wheels permanently secured to the shell billet holders and housed within the head, concentrically arranged driving shafts mounted in the sleeve and having their forward ends projecting beyond the forward end of the sleeve, pinions located on the rear ends of the shafts and meshing with the respective gear wheels, a stationary, centrally located shaft carried by the forward end of the drum, a sleeve rotatably mounted on the latter shaft, means for rotating the sleeve and intermeshing gears and pinions mounted on the sleeve and the forward ends of the shafts.

6. In a shell making machine in combination, a suitably supported stationary drum, a sleeve rotatably mounted on the drum, an outstanding head formed integral with the sleeve, concentrically arranged shell billet receiving and containing holders rotatably mounted in the head, means for intermittently rotating the head on the drum, gear wheels permanently secured to the shell billet holders and housed within the head, concentrically arranged driving shafts mounted in the sleeve and having their forward ends projecting beyond the forward end of the sleeve, pinions located on the rear ends of the shafts and meshing with the respective gear wheels, a stationary, centrally located shaft carried by the forward end of the drum, a sleeve rotatably mounted on the latter shaft, means for rotating the sleeve, driving gear wheels rotatably mounted on the forward ends of the driving shafts, pinions fixed on the sleeve and meshing continuously with the latter gear wheels and controlled sliding dogs for effecting a driving connection between the driving shafts and the gears thereon.

7. In a shell making machine in combination, a suitably supported stationary drum, a sleeve rotatably mounted on the drum, an outstanding head formed integral with the sleeve, concentrically arranged shell billet receiving and containing holders rotatably mounted in the head, means for intermittently rotating the head on the drum, gear wheels permanently secured to the shell billet holders and housed within the head, concentrically arranged driving shafts mounted in the sleeve and having their forward ends projecting beyond the forward end of the sleeve, pinions located on the rear ends of the shafts and meshing with the respective gear wheels, a stationary, centrally located shaft carried by the forward end of the drum, a sleeve rotatably mounted on the latter shaft, means for rotating the sleeve, driving gear wheels rotatably mounted on the forward ends of the driving shafts, pinions fixed on the sleeve and meshing continuously with the latter gear wheels, sliding dogs connected with the driving shafts and engageable with the driving gears of said shafts and sliding spindles mounted in the forward ends of the driving shafts and controlling the position of the dogs.

8. In a shell making machine in combination, a suitably supported stationary drum, a sleeve rotatably mounted on the drum, an outstanding head formed integral with the sleeve, concentrically arranged shell billet receiving and containing holders rotatably mounted in the head, means for intermittently rotating the head on the drum, gear wheels permanently secured to the shell billet holders and housed within the head, concentrically arranged driving shafts mounted in the sleeve and having their forward ends projecting beyond the forward end of the sleeve, pinions located on the rear ends of the shafts and meshing with the respective gear wheels, a stationary, centrally located shaft carried by the forward end of the drum, a sleeve rotatably mounted on the latter shaft, means for rotating the sleeve, pairs of driving gear wheels rotatably mounted on the forward ends of the driving shafts, said gear wheels having their adjacent faces provided with projecting flanges presenting ratchet teeth, collars permanently secured to each of the driving shafts, sliding dogs mounted in the collars and engageable with the ratchet teeth and spindles slidably mounted in the driving shafts and engaging with the inner ends of the dogs, said spindles being designed, when shifted, to project the dogs against the ratchet teeth, and having their forward ends provided with knobs.

9. In a shell making machine in combination, a suitably supported stationary cylindrical drum, a rotatably mounted head mounted on the drum, concentrically arranged, equally spaced shell billet receiving and containing holders rotatably mounted in the head, means for continuously rotating the holders, a plurality of tool carrying sliding shafts concentrically arranged around the drum and located on opposite sides of the head and alined with the holders, cams rotatably mounted on the drum and controlling the movement of the shafts to advance and retract the same to effect the operation of the tools on and the withdrawal of the same from the billets, means for simultaneously rotating the cams to simultaneously advance and retract the tools, automatically operated means for locking the head against rotation during the interval the tools are working on the billets and automatically operated means for turning the head one billet displacement during the interval that the tools are retracted.

10. In a shell making machine in combination, a front, a rear and an intermediate pedestal, a stationary drum carried by the pedestals, a head rotatably mounted on the drum between the front and intermediate pedestals, concentrically arranged, equally spaced shell billet receiving and containing holders rotatably mounted in the head, means for continuously rotating the holders, a plurality of concentrically arranged tool carrying working shafts arranged around the drum and slidably mounted in the intermediate and rear pedestals, said shafts being alined with the billets in the head, a plurality of base tool carrying shafts slidably mounted in the front pedestal and alined with the billets in the head, a cam roller secured to each of the working tool shafts, an advancing and retracting cam for each roller rotatably mounted on the drum, said cams being connected to rotate together, an operating connection between the working tool shafts and the base tool shafts, said connection being designed to advance the base tool shafts toward the billets coincident with the advancement of the working tool shafts toward the billets, means for driving the cams to advance and retract the tools in respect to the billets, means for rotating the head one billet displacement for each complete revolution of the cams, said means being actuated during the interval that the tools are withdrawn, automatic means for positively locking the head against rotation during the interval the tools are working on the billets and means for automatically unlocking the head prior to the turning of the same.

11. In a shell making machine in combination, a front, a rear and an intermediate pedestal, a stationary drum carried by the pedestals, a head rotatably mounted on the drum between the front and intermediate pedestals, concentrically arranged, equally spaced shell billet receiving and containing holders rotatably mounted in the head, means for continuously rotating the holders, a plurality of concentrically arranged tool carrying working shafts arranged around the drum and slidably mounted in the intermediate and rear pedestals, said shafts being alined with the billets in the head, a plurality of base tool carrying shafts slidably mounted in the front pedestal and alined with the billets in the head, a cam roller secured to each of the working tool shafts, an advancing and retracting cam for each roller rotatably mounted on the drum, said cams being connected to rotate together, an operating connection between the working tool shafts and the base tool shafts, said connection being designed to advance the base tool shafts toward the billets coincident with the advancement of the working tool shafts toward the billets, means for driving the cams to advance and retract the tools in respect to the billets, means for rotating the head one billet displacement for each complete revolution of the cams, said means being actuated during the interval that the tools are withdrawn, locking pins engageable with the head to lock the same against rotation during the interval the tools are working and means actuated by the cams in turning to release said locking pins at a predetermined instant and maintain them released during the interval that the head is rotating.

12. In a shell making machine in combination, a front, a rear and an intermediate pedestal, a stationary drum carried by the pedestals, a head rotatably mounted on the drum between the front and intermediate pedestals, concentrically arranged, equally spaced shell billet receiving and containing holders rotatably mounted in the head, means for continuously rotating the holders, a plurality of concentrically arranged tool carrying working shafts arranged around the drum and slidably mounted in the intermediate and rear pedestals, said shafts being alined with the billets in the head, a plurality of base tool carrying shafts slidably mounted in the front pedestal and alined with the billets in the head, a cam roller secured to each of the working tool shafts, an advancing and retracting cam for each roller rotatably mounted on the drum, said cams being connected to rotate together, an operating connection between the working tool shafts and the base tool shafts, said connection being designed to advance the base tool shafts toward the billets coincident with the advancement of the working tool shafts toward the billets, a gear wheel connected to the cams, means for driving the gear wheel to operate the cams to advance and retract the tools in respect to the billets, a spindle rotatably mounted in the intermediate pedestal, means actuated by the cams in turning for intermittently rotating the spindle, a driving connection between the spindle and the head, locking pins engageable with the head to lock the same against rotation during the interval that the tools are working and means actuated by the cams in turning to release said locking pins at a predetermined instant and maintain them released during the interval that the head is rotating.

13. In a shell making machine the combination with a tool carrying working shaft, said shaft being split and having the split ends telescoped one within the other and one of said telescoped ends cross slotted, of a cross pin carried by the other of the ends and passing slidably through the cross slot, collars permanently secured to the split ends of the shaft, an expanding spring mounted on the shaft and located between the collars and normally holding the tool carrying end of the shaft advanced with the cross pin in the rear end of the slot and an electrically operated alarm appliance connected in circuit with the split ends of the shaft and arranged such that the circuit is closed and the alarm given upon the forward end of the shaft being forced backwardly against the action of the spring.

Signed at Winnipeg, this 8th day of December, 1915.

JOHN ELZEARD ENNIS.

In the presence of—
G. S. ROXBURGH,
C. S. SILVERT.